US012750426B2

(12) United States Patent
Pattan et al.

(10) Patent No.: US 12,750,426 B2
(45) Date of Patent: Sep. 29, 2026

(54) METHOD AND APPARATUS MANAGING EDGE ENABLER SERVER (EES) IN COMMUNICATION SYSTEM

(71) Applicant: SAMSUNG ELECTRONICS CO., LTD., Suwon-si (KR)

(72) Inventors: Basavaraj Jayawant Pattan, Bangalore (IN); Narendranath Durga Tangudu, Bangalore (IN); Sapan Pramodkumar Shah, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 127 days.

(21) Appl. No.: 18/862,495

(22) PCT Filed: Apr. 28, 2023

(86) PCT No.: PCT/KR2023/005901
§ 371 (c)(1),
(2) Date: Nov. 1, 2024

(87) PCT Pub. No.: WO2023/214757
PCT Pub. Date: Nov. 9, 2023

(65) Prior Publication Data

US 2025/0260745 A1 Aug. 14, 2025

(30) Foreign Application Priority Data

May 3, 2022 (IN) ............................. 202241025648
Apr. 14, 2023 (IN) ............................. 202241025648

(51) Int. Cl.
*H04L 67/51* (2022.01)
*H04L 67/55* (2022.01)

(52) U.S. Cl.
CPC .............. *H04L 67/51* (2022.05); *H04L 67/55* (2022.05)

(58) Field of Classification Search
CPC ..... H04L 67/51; H04L 67/55; H04L 67/1095; H04L 67/131; H04L 67/148;
(Continued)

(56) References Cited

U.S. PATENT DOCUMENTS

2022/0104010 A1* 3/2022 Stockhammer ......... H04L 9/088
2022/0110081 A1* 4/2022 Gupta ..................... H04L 67/51
(Continued)

FOREIGN PATENT DOCUMENTS

WO 2022070042 A1 4/2022
WO WO-2022239349 A1 * 11/2022 ............. H04L 67/51

OTHER PUBLICATIONS

Office Action issued Jan. 13, 2025, in connection with Indian Patent Application No. 202241025648, 6 pages.
(Continued)

*Primary Examiner* — Richard G Keehn

(57) ABSTRACT

The disclosure relates to a 5G or 6G communication system for supporting a higher data transmission rate. Disclosed herein is a method of a first Edge Enabler Server (EES) in an edge network comprising the first EES and a second EES. The methods comprises receiving, from the second EES, a context push request message for context transfer procedures; validating and authorizing the second EES in response to the push request message; and in case that the second EES is authorized and the first EES and the second EES are part of same EES set of the edge network, storing first information included in the context push request message for synchronization with the second EES and transmitting, to the second EES, a context push response message, wherein the first information comprises at least one of a list of Edge Enabler Client (EEC) contexts, or a list of Edge Application Server (EAS) profiles.

14 Claims, 4 Drawing Sheets

(58) Field of Classification Search
CPC ............... H04L 67/303; H04L 41/0806; H04L 41/0853; H04L 41/14; H04L 41/16; H04L 41/0866; G06F 11/2023; G06F 11/2097
See application file for complete search history.

(56) References Cited

U.S. PATENT DOCUMENTS

| | | | | |
|---|---|---|---|---|
| 2022/0116774 | A1 | 4/2022 | Rajadurai et al. | |
| 2022/0377389 | A1* | 11/2022 | Sodagar | H04L 67/51 |
| 2023/0026671 | A1* | 1/2023 | Seed | H04W 36/0033 |
| 2023/0156094 | A1* | 5/2023 | Hergenhan | H04L 67/51 709/227 |
| 2024/0040005 | A1* | 2/2024 | Hu | H04L 67/148 |
| 2024/0056906 | A1* | 2/2024 | Xu | H04L 67/52 |
| 2024/0095100 | A1* | 3/2024 | Pateromichelakis | H04L 67/34 |
| 2025/0023954 | A1* | 1/2025 | Xu | H04L 67/51 |
| 2025/0056387 | A1* | 2/2025 | Zhang | H04L 67/51 |
| 2025/0106263 | A1* | 3/2025 | Xu | H04L 67/148 |
| 2025/0142421 | A1* | 5/2025 | Pateromichelakis | H04L 67/34 |
| 2025/0175517 | A1* | 5/2025 | Xu | H04L 67/1001 |

OTHER PUBLICATIONS

Office Action dated Dec. 15, 2025, in connection with European Patent Application No. 23 799 639.2, 9 pages.
International Search Report and Written Opinion of the International Searching Authority dated Aug. 1, 2023, in connection with International Application No. PCT/KR2023/005901, 8 pages.
3GPP TS 23.558 V17.3.0 (Mar. 2022) Technical Specification, 3rd Generation Partnership Project; Technical Specification Group Services and System Aspects; Architecture for enabling Edge Applications; (Release 17), Mar. 2022, 166 pages.
Huawei et al., "Issues with Application Context Relocation (ACR)", C1-217087, 3GPP TSG-CT WG1 Meeting #133-e, E-meeting, Nov. 11-19, 2021, 9 pages.
Samsung, "EEC context relocation", S6-212090 (revision of S6-211969 was 1836), 3GPP TSG-SA WG6 Meeting #45, e-meeting, Aug. 25-Sep. 3, 2021, 29 pages.
Supplementary European Search Report dated Apr. 28, 2025, in connection with European Patent Application No. 23799639.2, 12 pages.
Examination report issued Jul. 1, 2026, in connection with European Patent Application No. 23799639.2, 17 pages.

* cited by examiner

[Fig. 1a]
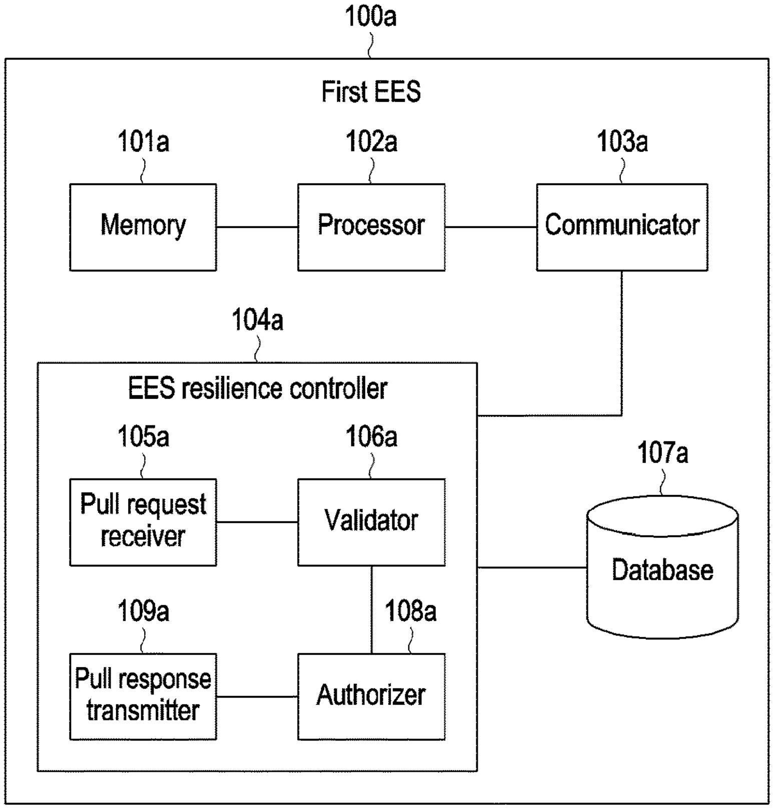
[Fig. 1b]
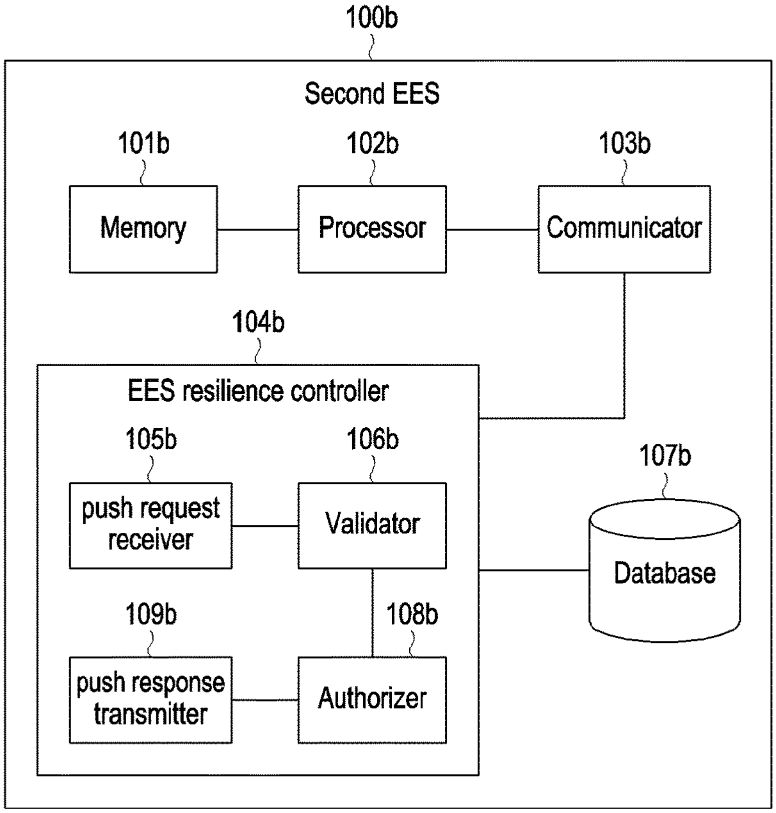

[Fig. 2]
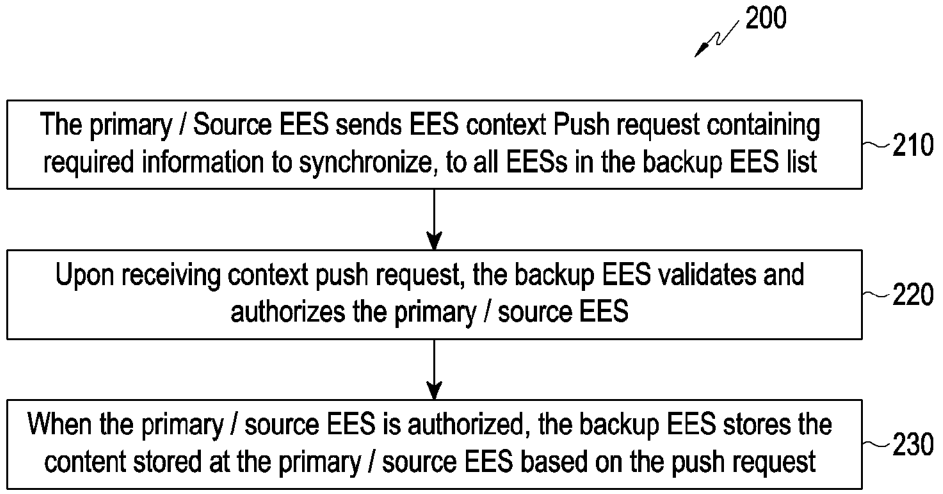
[Fig. 3]
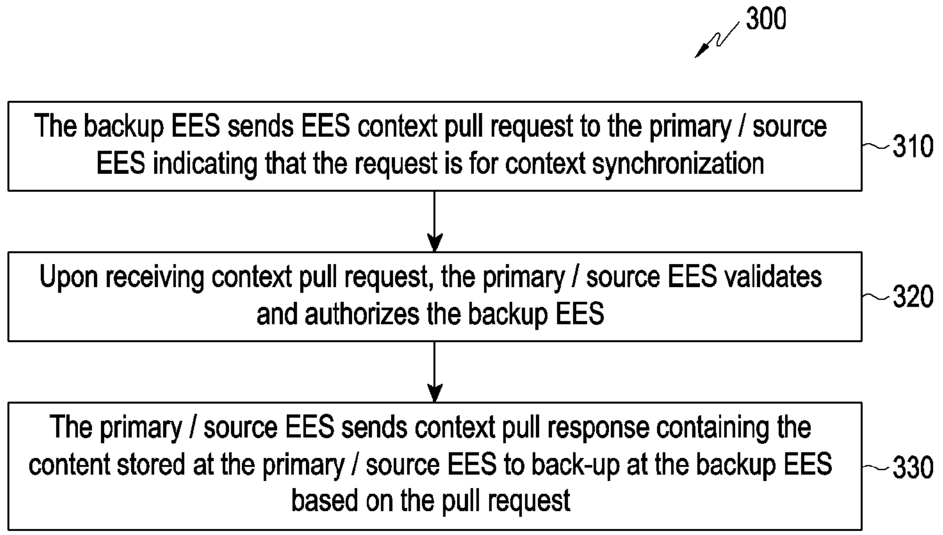
[Fig. 4a]
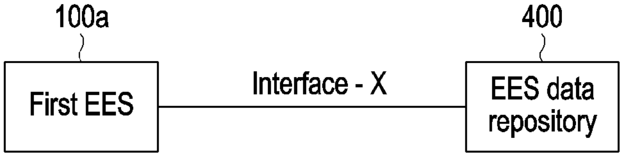

[Fig. 4b]
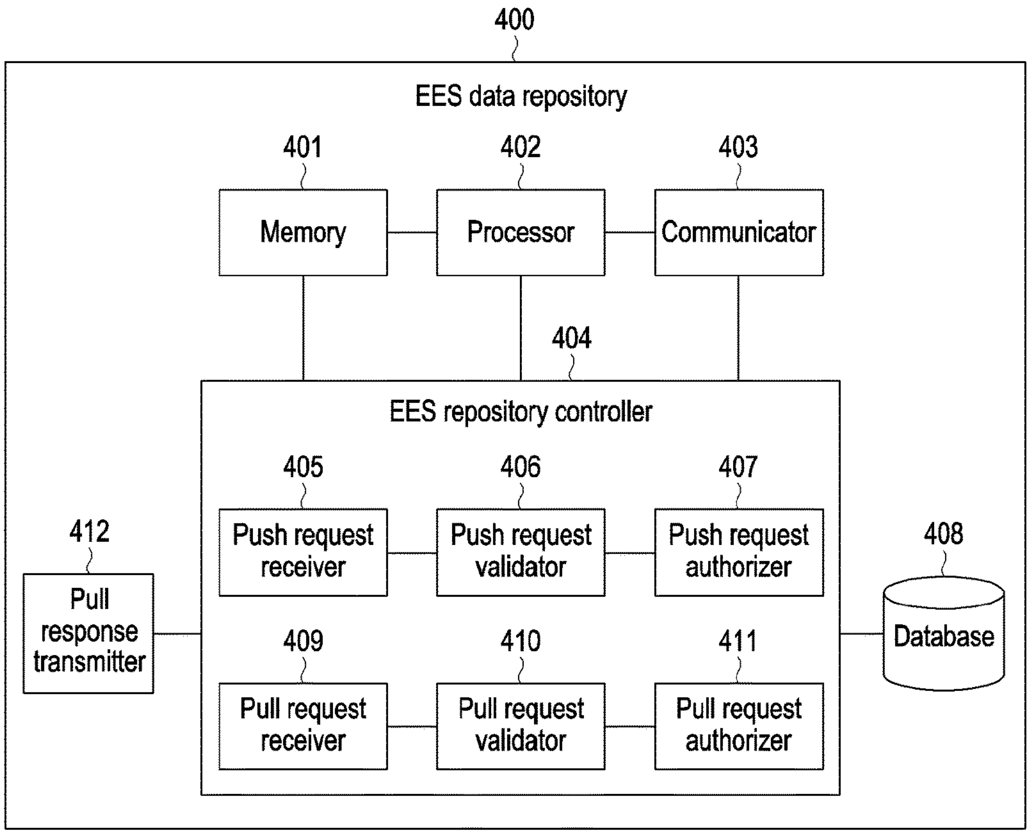
[Fig. 5]
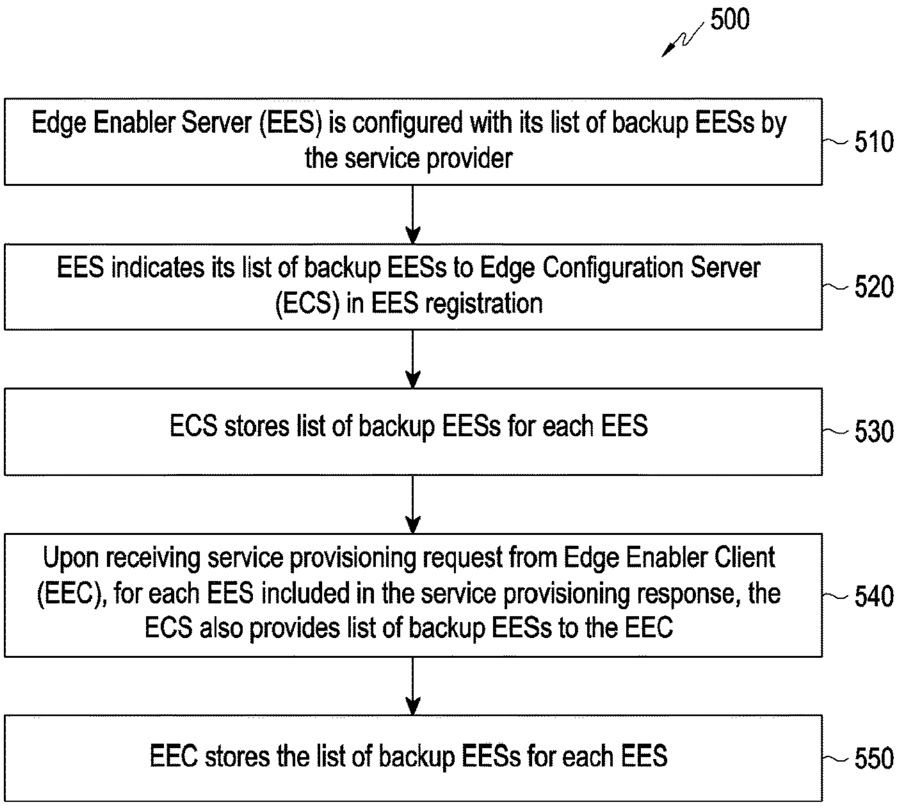

[Fig. 6]
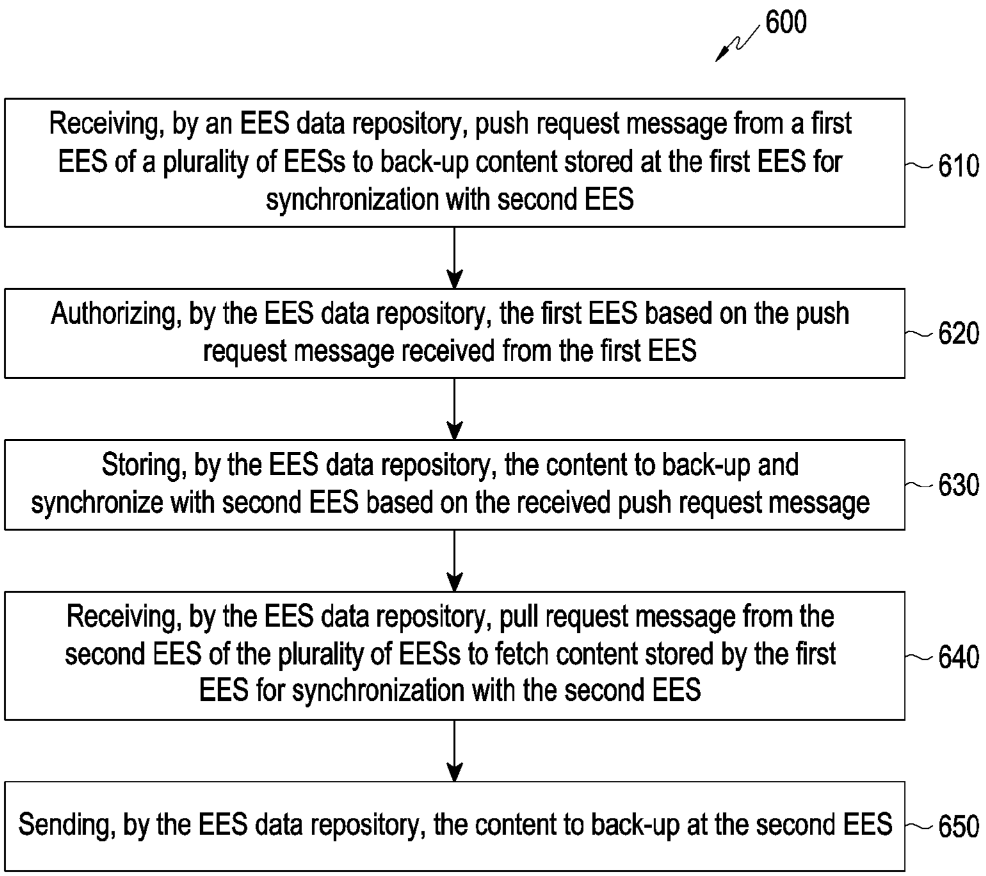

METHOD AND APPARATUS MANAGING EDGE ENABLER SERVER (EES) IN COMMUNICATION SYSTEM

CROSS-REFERENCE TO RELATED APPLICATIONS

This application is a U.S. National Phase Entry of PCT International Application No. PCT/KR2023/005901, which was filed on Apr. 28, 2023, and claims priority to Indian patents application Nos. 202241025648, filed on May 3, 2022, and 202241025648, filed on Apr. 14, 2023, respectively, the entire disclosure of each of which is incorporated herein by reference.

TECHNICAL FIELD

The present invention relates to a wireless communication. More particularly the present invention relates to a method and apparatus managing edge enabler server (EES) s in a communication system.

BACKGROUND ART 5G mobile communication technologies define broad frequency bands such that high transmission rates and new services are possible, and can be implemented not only in “Sub 6 GHz” bands such as 3.5 GHz, but also in “Above 6 GHz” bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIOT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultrahigh-performance communication and computing resources.

In general, $5^{th}$ Generation (5G) technology is expected to have high speed data transmission that is increased by multiple times compared to previous generation networks. In order to reduce the latency, an edge computing is required to bring the computing resources near to end users. In existing method, a Third Generation Partnership Project (3GPP) has defined an EEL. The EEL specifies an Edge Enabler Client (EEC) which provides client-side functionalities of the EEL to support Application Clients (ACs) in a User Equipment (UE). The EEL also specifies an Edge Enabler Server (EES) which provides server-side functionalities of the EEL to support an Edge Application Servers (EASs). The EES plays an important role and exposes Application Programming Interfaces (APIs) to support capabilities for example, registration, application server discovery, capability exposure to the ACs and support for service continuity. The ACs locate and connect with the suitable EAS available in an Edge Data Network (EDN) based on the capabilities provided by the EES.

In order to provide an efficient service to the ACs and the EASs, the EEL has to be resilient that is the EEL continue to provide service to ACs and the EASs in an event of failure of the EES. In order to be resilient, the EEL has an ability to recover from a fault and also maintain persistency of service dependability during the faults. It is required to make the EEL service resilient to the EES failures.

DISCLOSURE OF INVENTION

Solution to Problem

The principal object of the embodiments herein is to provide a system and method to handle Edge Enabler Server (EES) failure in an edge network. In the proposed method, the cloud network is configured to back-up the EES content in an event of failure of the EES. The proposed method has an ability to recover from a fault and maintain persistency of service dependability at the time of the EES failure.

Another object of the embodiments herein is to provide a system and method for sending a push request message to a backup EES for synchronizing a content stored in a source EES.

Yet another object of the embodiments herein is to provide a system and method for sending a pull request message to the source EES for backing up the content from the source EES to the backup EES.

Yet another object of the embodiments herein is to provide a system and method for synchronizing the content between the source EES and the backup EES based on an EES data repository.

Accordingly, the embodiments herein provide a method of a first Edge Enabler Server (EES) in an edge network comprising the first EES and a second EES. The methods comprises receiving, from the second EES, a context push request message for context transfer procedures; validating and authorizing the second EES in response to the push request message; and in case that the second EES is authorized and the first EES and the second EES are part of same EES set of the edge network, storing first information included in the context push request message for synchronization with the second EES and transmitting, to the second EES, a context push response message, wherein the first information comprises at least one of a list of Edge Enabler Client (EEC) contexts, or a list of Edge Application Server (EAS) profiles.

In the embodiments, the first information further comprises an indication for context synchronization between the first EES and the second EES. Second information included in the context push response message comprises at least one of the list of EEC context, the list of EAS profiles, and an indication for context synchronization between the first EES and the second EES.

Accordingly, the embodiments herein provide a method of a second Edge Enabler Server (EES) in an edge network comprising at least one first EES and the second EES. The method comprises transmitting, to the at least one first EES, a context push request message for context transfer procedures; and in case that the second EES is authorized, and the at least one first EES and the second EES are part of same EES set of the edge network, receiving, from the at least one first EES, a context push response message, wherein first information included in the context push request message is stored in the at least one first EES, and wherein the first information comprises at least one of a list of Edge Enabler Client (EEC) contexts, or a list of Edge Application Server (EAS) profiles.

In the embodiments, the first information included in the context push request message further comprises an indication for content synchronization between the at least one first EES and the second EES. The method further comprises transmitting, to Edge Configuration Server (ECS), an EES registration request message including indication for the at least one second EES.

In the embodiments, second information included in the context push response message comprises at least one of the list of EEC contexts, the list of EAS profiles, or an indication for context synchronization between the first EES and the second EES.

Accordingly, the embodiments herein provide a first Edge Enabler Server (EES) in an edge network comprising the first EES and a second EES. The first EES comprises: a memory; a communicator; and a processor coupled to the memory and the communicator, and configured to: receive, from the second EES, a context push request message for context transfer procedures, validate and authorize the second EES in response to the push request message, and in case that the second EES is authorized and the first EES and the second EES are part of same EES set of the edge network, store first information included in the context push request message for synchronization with the second EES and transmit, to the second EES, a context push response message, wherein the first information comprises at least one of a list of Edge Enabler Client (EEC) contexts, or a list of Edge Application Server (EAS) profiles.

In the embodiments, the first information further comprises an indication for context synchronization between the first EES and the second EES. And, second information included in the context push response message comprises at least one of the list of EEC context, the list of EAS profiles, or an indication for context synchronization between the first EES and the second EES.

Accordingly, the embodiments herein provide a second Edge Enabler Server (EES) in an edge network comprising at least one first EES and the second EES, the second EES comprising: a memory; a communicator; and a processor coupled to the memory and the communicator, and configured to: transmit, to the at least one first EES, a context push request message for context transfer procedures, and in case that the second EES is authorized, and the at least one first EES and the second EES are part of same EES set of the edge network, receive, from the at least one first EES, a context push response message, wherein first information included in the context push request message is stored in the at least one first EES, and wherein the first information comprises at least one of a list of Edge Enabler Client (EEC) contexts, or a list of Edge Application Server (EAS) profiles.

In the embodiments, the first information included in the context push request message further comprises an indication for content synchronization between the at least one first EES and the second EES. The processor is further configured to transmit, to Edge Configuration Server (ECS), an EES registration request message including indication for the at least one second EES.

In the embodiments, second information included in the context push response message comprises at least one of the list of EEC contexts, the list of EAS profiles, or an indication for context synchronization between the first EES and the second EES.

Accordingly, the embodiments herein provide a method for handling EES failure to make service resilience EEL in an edge network. The method includes receiving, by a second EES of a plurality of EESs, a push request message from a first EES of the plurality of EESs to back-up content stored at the first EES for synchronization with the second EES. Also, the method includes validating and authorizing, by the second EES, the first EES based on the push request message received from the first EES. The method further includes backing up, by the second EES, the content stored at the first EES by storing the content at the second EES based on the push request message.

In the embodiments, the push request message includes the content that requires to be back-up at the second EES. The content includes a list of EEC contexts associated with the first EES, a list of EAS profiles associated with the first EES, an indication to back-up the content associated with the first EES, details about subscriptions over different EDGE interfaces, and a list of second EESs from the plurality of EESs configured at the first EES for back-up the content for the synchronization.

Accordingly, the embodiments herein provide a method for handling the EES failure to make service resilience in the EEL of the edge network. The method includes receiving, by the first EES of the plurality of EESs, a pull request message from the second EES of the plurality of EESs to back-up the content stored at the first EES for synchronization with the second EES and authorizing, by the first EES, the second EES based on the pull request message received from the second EES. The method further includes sending, by the second EES, a response includes the content stored at the first EES to back-up at the second EES based on the pull request message.

In the embodiments, the response to the pull request message includes the content that requires to be back-up at the second EES. The content includes the list of EEC contexts associated with the first EES, the list of EAS profiles associated with the first EES, the indication to back-up the content associated with the first EES, the details about the subscriptions over different EDGE interfaces, and the list of second EESs from the plurality of EESs configured at the first EES for back-up the content for the synchronization.

In the embodiments, providing, by the first EES, the content with respect to the list of second EESs from the plurality of EESs and an identity of an EES set to an Edge Configuration Server (ECS) in the EEL of the edge network.

In the embodiments, the method includes storing, by the ECS in the EEL of the edge network, the content with respect to the list of second EESs of the plurality of EESs and the identity of the EES set. The method includes receiving, by the ECS, a service provisioning request message from the EEC. The method further includes sending, by the ECS, a service provisioning response message to the EEC for storing the service provisioning response message by the EEC.

In the embodiments, the service provisioning response message includes the content of a plurality of second EESs and identity of an EES set. The EES set includes the first EES and the list of second EESs.

Accordingly, the embodiments herein provide a method for handling the EES failure to make service resilience of the EEL in the edge network. The method includes receiving, by an EES data repository, the push request message from the first EES of the plurality of EESs to back-up the content stored at the first EES for synchronization with the second EES. The method includes authorizing, by the EES data repository, the first EES based on the push request message received from the first EES. Also, the method includes storing, by the EES data repository, the content to back-up and synchronize with the second EES based on the received push request message. The method further includes receiving, by an EES data repository, the pull request message from the second EES of the plurality of EESs to fetch the content stored by the first EES for synchronization with the second EES. The EES data repository includes the content of the first EES for synchronization with the at least one second EES associated with the first EES in the EEL of the edge network. Also, the method includes sending, by the EES data repository, the content to back-up at the second EES.

Accordingly, the embodiments herein provide a system for handling failure of the EES to make service resilience of the EEL in the edge network. The EEL in the edge network includes the first EES and the second EES of the plurality of EES. The second EES includes a memory, a processor coupled to the memory, a communicator coupled to the processor, and an EES resilience controller coupled to the memory, the processor, and the communicator. The EES resilience controller is configured to receive the push request message from the first EES of the plurality of EESs to back-up the content stored at the first EES for synchronization with the second EES and enable communication between the second EES and the EEC in the EEL of the edge network. The EES resilience controller is configured to validate and authorize the first EES based on the push request message received from the first EES. The EES resilience controller further configured to back-up the content stored at the first EES by storing the content at the second EES based on the push request message.

Accordingly, the embodiments herein provide a system for handling the EES failure to make service resilience of the EEL in the edge network. The EEL in the edge network includes the first EES and the second EES of the plurality of EES. The first EES includes the memory, the processor coupled to the memory, and the communicator coupled to the processor, and the EES resilience controller coupled to the memory, the processor, and the communicator. The EES resilience controller is configured to receive the pull request message from the second EES of the plurality of EESs to back-up the content stored at the first EES for synchronization with the second EES and enable communication between the second EES and the EEC in the EEL of the edge network. The EES resilience controller is configured to validate and authorize the second EES based on the pull request message received from the second EES. The EES resilience controller is further configured to send the response includes the content stored at the first EES to back-up at the second EES based on the pull request message.

Accordingly, the embodiments herein provide a system for handling the EES failure to make service resilience of the EEL in an edge network. The EEL in the edge network includes the EES data repository. The EES data repository includes the memory, the processor coupled to the memory, and the communicator coupled to the processor, and the EES resilience controller coupled to the memory, the processor, and the communicator. The EES resilience controller is configured to receive the push request message from the first EES of the plurality of EESs to back-up the content stored at the first EES for synchronization with the second EES. The EES resilience controller is configured to authorize the first EES based on the push request message received from the first EES. The EES resilience controller configured to store the content to back-up and synchronize with the second EES based on the received push request message. The EES resilience controller further configured to receive the pull request message from the second EES of the plurality of EESs to fetch the content stored by the first EES for synchronization with the second EES and enabling communication between the second EES and the EEC in the EEL of the edge network. The EES data repository includes the content of the first EES for synchronization with the second EES associated with the first EES in the EEL of the edge network. Also, the EES resilience controller is configured to send the content to back-up at the second EES.

These and other aspects of the embodiments herein will be better appreciated and understood when considered in conjunction with the following description and the accompanying drawings. It is understood, however, that the following descriptions, while indicating preferred embodiments and numerous specific details thereof, are given by way of illustration and not of limitation. Many changes and modifications be made within the scope of the embodiments herein without departing from the spirit thereof, and the embodiments herein include all such modifications.

BRIEF DESCRIPTION OF DRAWINGS

These and other features, aspects, and advantages of the present invention is illustrated in the accompanying drawings, throughout which like reference letters indicate corresponding parts in the various figures. The embodiments herein will be better understood from the following description with reference to the drawings, in which:

FIG. 1*a* is a block diagram of a first EES, according to the embodiments as disclosed herein;

FIG. 1*b* is a block diagram of a second EES, according to the embodiments as disclosed herein;

FIG. 2 is a flow chart illustrating a method for synchronizing the first EES and the second EES based on push mechanism, according to the embodiments as disclosed herein;

FIG. 3 is a flow chart illustrating a method for synchronizing the first EES and the second EES based on pull mechanism, according to the embodiments as disclosed herein;

FIG. 4*a* illustrates an interface connecting the first EES and an EES data repository, according to the embodiments as disclosed herein;

FIG. 4*b* is a block diagram of the EES data repository, according to the embodiments as disclosed herein;

FIG. 5 is a flow chart illustrating a method for sending a list of second EESs to an EEC, according to the embodiments are disclosed herein; and FIG. 6 is a flow chart illustrating a method for synchronizing the first EES and the second EES by the EES data repository, according to the embodiments are disclosed herein.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples are not be construed as limiting the scope of the embodiments herein.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises 젼a" does not, without more constraints, preclude the existence of other elements or additional elements in the system or method.

It is to be understood that the singular forms "a," "an," and "the" include plural referents unless the context clearly dictates otherwise. Thus, for example, reference to "a component surface" includes reference to one or more of such surfaces. "/" represents "and/or", for example, "first/second node" represents the first node and the second node, or the first node or the second node.

The term "include" or "may include" refers to the existence of a corresponding disclosed function, operation or component which can be used in various embodiments of the present disclosure and does not limit one or more additional functions, operations, or components. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in various embodiments of the present disclosure includes any or all of combinations of listed words. For example, the expression "A or B" may include A, may include B, or may include both A and B.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operations are performed over the computer or other programmable data processing devices and operate the computer or other programmable data processing devices may provide operations for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element, such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or sub units. Further, an element or a 'unit' may be implemented to reproduce one or more central processing units (CPUs) in a device or a security multimedia card. According to embodiments of the disclosure, a " . . . unit" may include one or more processors.

As is traditional in the field, embodiments are described and illustrated in terms of blocks that carry out a described function or functions. These blocks, which referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and optionally be driven by firmware and software. The circuits, for example, be embodied in one or more semiconductor chips, or on substrate supports such as printed circuit boards and the like. The circuits constituting a block be implemented by dedicated hardware, or by a processor (e.g., one or more programmed microprocessors and associated circuitry), or by a combination of dedicated hardware to perform some functions of the block and a processor to perform other functions of the block. Each block of the embodiments be physically separated into two or more interacting and discrete blocks without departing from the scope of the proposed method. Likewise, the blocks of the embodiments be physically combined into more complex blocks without departing from the scope of the proposed method.

The accompanying drawings are used to help easily understand various technical features and it is understood that the embodiments presented herein are not limited by the accompanying drawings. As such, the proposed method is construed to extend to any alterations, equivalents and substitutes in addition to those which are particularly set out in the accompanying drawings. Although the terms first, second, etc. used herein to describe various elements, these elements are not be limited by these terms. These terms are generally used to distinguish one element from another.

Accordingly, the embodiments herein provide a method for handling EES failure to make service resilience EEL in an edge network. The method includes receiving, by a second EES of a plurality of EESs, a push request message from a first EES of the plurality of EESs to back-up content stored at the first EES for synchronization with the second EES. Also, the method includes validating and authorizing, by the second EES, the first EES based on the push request message received from the first EES. The method further includes backing up, by the second EES, the content stored at the first EES by storing the content at the second EES based on the push request message.

Accordingly, the embodiments herein provide a method for handling the EES failure to make service resilience in the EEL of the edge network. The method includes receiving, by the first EES of the plurality of EESs, a pull request message from the second EES of the plurality of EESs to back-up the content stored at the first EES for synchronization with the second EES and enabling communication between the second EES and the EEC in the EEL of the edge network. Also, the method includes validating and authorizing, by the first EES, the second EES based on the pull request message received from the second EES. The method further includes sending, by the second EES, a response includes the content stored at the first EES to back-up at the second EES based on the pull request message.

Accordingly, the embodiments herein provide a method for handling the EES failure to make service resilience of the EEL in the edge network. The method includes receiving, by an EES data repository, the push request message from the first EES of the plurality of EESs to back-up the content stored at the first EES for synchronization with the second EES. The method includes authorizing, by the EES data repository, the first EES based on the push request message received from the first EES. Also, the method includes storing, by the EES data repository, the content to back-up and synchronize with the second EES based on the received push request message. The method further includes receiving, by an EES data repository, the pull request message from the second EES of the plurality of EESs to fetch the content stored by the first EES for synchronization with the second EES and enabling communication between the second EES and the EEC in the EEL of the edge network. The EES data repository includes the content of the first EES for synchronization with the at least one second EES associated with the first EES in the EEL of the edge network. Also, the method includes sending, by the EES data repository, a response includes the content to back-up at the second EES.

Accordingly, the embodiments herein provide a system for handling failure of the EES to make service resilience of the EEL in the edge network. The EEL in the edge network includes the first EES and the second EES of the plurality of EES. The second EES includes a memory, a processor coupled to the memory, a communicator coupled to the processor, and an EES resilience controller coupled to the memory, the processor, and the communicator. The EES resilience controller is configured to receive the push request message from the first EES of the plurality of EESs to back-up the content stored at the first EES for synchronization with the second EES and enable communication between the second EES and the EEC in the EEL of the edge network. The EES resilience controller is configured to validate and authorize the first EES based on the push request message received from the first EES. The EES resilience controller further configured to back-up the content stored at the first EES by storing the content at the second EES based on the push request message.

Accordingly, the embodiments herein provide a system for handling the EES failure to make service resilience of the EEL in the edge network. The EEL in the edge network includes the first EES and the second EES of the plurality of EES. The first EES includes the memory, the processor coupled to the memory, and the communicator coupled to the processor, and the EES resilience controller coupled to the memory, the processor, and the communicator. The EES resilience controller is configured to receive the pull request message from the second EES of the plurality of EESs to back-up the content stored at the first EES for synchronization with the second EES and enable communication between the second EES and the EEC in the EEL of the edge network. The EES resilience controller is configured to validate and authorize the second EES based on the pull request message received from the second EES. The EES resilience controller is further configured to send the response includes the content stored at the first EES to back-up at the second EES based on the pull request message.

Accordingly, the embodiments herein provide a system for handling the EES failure to make service resilience of the EEL in the edge network. The EEL in the edge network includes the EES data repository. The EES data repository includes the memory, the processor coupled to the memory, and the communicator coupled to the processor, and the EES resilience controller coupled to the memory, the processor, and the communicator. The EES resilience controller is configured to receive the push request message from the first EES of the plurality of EESs to back-up the content stored at the first EES for synchronization with the second EES. The EES resilience controller is configured to authorize the first EES based on the push request message received from the first EES. The EES resilience controller configured to store the content to back-up and synchronize with the second EES based on the received push request message. The EES resilience controller further configured to receive the pull request message from the second EES of the plurality of EESs to fetch the content stored by the first EES for synchronization with the second EES and enabling communication between the second EES and the EEC in the EEL of the edge network. The EES data repository includes the content of the first EES for synchronization with the second EES associated with the first EES in the EEL of the edge network. Also, the EES resilience controller is configured to send the content to back-up at the second EES.

In conventional methods, when the EES faces any failure issues for example unfortunate shutdown, system crash, hardware failure, software failure and the like the conventional method does not have any efficient way to handle failure issues. Due to the sudden failures of the EES, the ACs and the EASs gets affected by not receiving data in consistent manner from the EES.

Unlike the conventional methods, in order to provide efficient service to the ACs and the EASs, the EEL continues to provide service to the ACs and the EASs in an event of the failure of a source EES. The EEL has an ability to recover from a fault and maintain persistency of service dependability at the time of faults. The proposed method provides system and methods to handle the failure of the source EES and allow the EEL to be service resilient to the failure of the source EES.

Unlike the conventional methods, once the source EES faces any failure issues, the source EES perform synchronization operation to synchronize the content to the backup EES that is configured under the source EES. Once the source EES synchronizes the content to the backup EES, the ACs and the EASs receives the service from the backup EES.

The terms "second EES" and "backup EES" are used interchangeably throughout the specification.

The terms "first EES" and "primary or source EES" are used interchangeably throughout the specification.

In the embodiments, in order to make sure that the EEL continues to provide service to the ACs and the EASs in the event of failure of each EES that is registered to the ECS, a service provider provides the list of backup EESs. Each list of backup EESs have the backup EES list identifier to identify the backup EES list.

Referring now to the drawings and more particularly to FIGS. 1 through 6, where similar reference characters denote corresponding features consistently throughout the figure, these are shown preferred embodiments.

FIG. 1*a* illustrates a block diagram of a first EES (100*a*), according to the embodiments as disclosed herein. The first EES (100*a*) includes a memory (101*a*), a processor (102*a*) coupled to the memory (101*a*), a communicator (103*a*) coupled to the processor (102*a*), an EES resilience controller (104*a*) connected to the memory (101*a*), the processor (102*a*), and the communicator (103*a*). The EES resilience controller (104*a*) is configured to receive the pull request message from a second EES (100*b*) of the plurality of EESs (100*a-n*) to back-up content stored at the first EES (100*a*) for synchronization with the second EES (100*b*) and enable communication between the second EES (100*b*) and an EEC (not shown in figures) in the EEL of the edge network. The EES resilience controller (104*a*) is configured to validate the second EES (100*b*) based on the pull request message received from the second EES (100*b*). Also, the EES resilience controller (104*a*) is configured to send the content stored at the first EES (100*a*) to back-up the second EES (100*b*) based on the pull request message.

The memory (101*a*) is configured to store instructions to be executed by the processor (102*a*). The memory (101*a*) includes non-volatile storage elements. Examples of such non-volatile storage elements includes magnetic hard discs, optical discs, floppy discs, flash memories, or forms of Electrically Programmable Memories (EPROM) or Electrically Erasable and Programmable Memories (EEPROM). In addition, the memory (101*a*) in some examples, be considered a non-transitory storage medium. The term "non-transitory" indicates that the storage medium is not embodied in a carrier wave or a propagated signal. However, the term "non-transitory" is not be interpreted that the memory (101*a*) is non-movable. In some examples, the memory (101*a*) is configured to store larger amounts of information. In certain examples, a non-transitory storage medium stores data that can, over time, change (e.g., in Random Access Memory (RAM) or cache).

The processor (102*a*) includes one or a plurality of processors. The one or the plurality of processors is a general-purpose processor, such as a central processing unit (CPU), an application processor (AP), or the like, a graphics processing unit such as a graphics processing unit (GPU), a Visual Processing Unit (VPU), and/or an AI-dedicated processor such as a neural processing unit (NPU). The processor (102*a*) includes multiple cores and is configured to execute the instructions stored in the memory (101*a*).

In the embodiments, the communicator (103*a*) includes an electronic circuit specific to a standard that enables wired or wireless communication. The communicator (103*a*) is configured to communicate internally between internal hardware components of the first EES (100*a*) and with external devices via one or more networks.

In the embodiments, a response to the pull request message includes the content that requires to be back-up at the second EES (100*b*). The content includes a list of EEC contexts associated with the first EES, a list of EAS profiles associated with the first EES, an indication to back-up the content associated with the first EES, details about subscriptions over different EDGE interfaces, and a list of second EESs from the plurality of EESs configured at the first EES for back-up the content for the synchronization, where the indication represents to indicate a request for EES synchronization. The indication also represents Boolean flag with true/false value or name of the message or name of an event or anything else.

In the embodiments, the first EES (100*a*) further includes a database (107*a*) that is configured to store the list of EEC contexts associated with the first EES, the list of EAS profiles associated with the first EES, the details about the subscriptions over different EDGE interfaces, and the list of second EESs from the plurality of EESs (100*a-n*).

In the embodiments, the EES resilience controller (104*a*) includes a pull request receiver (105*a*), a validator (106*a*), an authorizer (108*a*), and a pull response transmitter (109*a*). The pull request receiver (105*a*) receives the pull request message from the second EES (100*b*) and transmits the pull request message to the validator (106*a*). The validator (106*a*) is configured to validate the second EES (100*b*) based on the pull request message received from the second EES (100*b*). The validator (106*a*) checks the identity of the second EES (100*b*) by comparing the list of second EESs that is stored in the database (107*a*). After the comparison, the validator (106*a*) sends the validation result to the authorizer (108*a*). The authorizer (108*a*) is configured to check the result that is received from the validator (106*a*). On successful validation of the second EES (100*b*), the authorizer (108*a*) authorizes the second EES (100*b*). When the result of the validation is failed, the authorizer (108*a*) rejects the pull request message received from the second EES (100*b*). The failure in validation represents that the second EES is not a backup of the first EES (100*a*) and the second EES is not in the same EES set of the first EES.

In the embodiments, the EES set represents a set that includes plurality of EESs (101*a-n*). Among the plurality of EESs (101*a-n*), the at least one EES act as a source EES and remaining EES act as a backup EES.

In the embodiments, on successful validation, the authorizer (108*a*) sends the authorization message to the pull response transmitter (109*a*). The pull response transmitter (109*a*) transmits the authorization message to the second EES (100*b*), where the authorization message represents to authorize the second EES (100*b*) based on the success of the validation result received from the validator (106*a*).

In the embodiments, when the validation result is failed, the authorizer (108*a*) sends the rejection message to the pull response transmitter (109*a*). The pull response transmitter (109*a*) transmits the rejection message to the second EES (100*b*), where the rejection message is transferred to the second EES (100*b*) to reject the second EES based on the failed validation result received from the validator (106*a*).

The EES resilience controller (104*a*) is implemented by processing circuitry such as logic gates, integrated circuits, microprocessors, microcontrollers, memory circuits, passive electronic components, active electronic components, optical components, hardwired circuits, or the like, and optionally be driven by firmware. The circuits for example, be embodied in one or more semiconductor chips, or on substrate supports such as printed circuit boards and the like.

At least one of the plurality of modules/components of the EES resilience controller (104*a*) is implemented through an AI model. A function associated with the AI model that is performed through memory (101*a*) and the processor (102*a*). The one or a plurality of processors controls the processing of the input data in accordance with a predefined operating rule or the AI model stored in the non-volatile memory and the volatile memory. The predefined operating rule or artificial intelligence model is provided through training or learning.

Here, being provided through learning means that, by applying a learning process to a plurality of learning data, a predefined operating rule or AI model of a desired characteristic is made. The learning is performed in a device itself in which AI according to the embodiments is performed, and/or is implemented through a separate server/system.

The AI model consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), Deep Belief Network (DBN), bidirectional recurrent deep neural network (BRDNN), Generative Adversarial Networks (GAN), and deep Q-networks.

The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

FIG. 1*b* illustrates a block diagram of the second EES (100*b*), according to the embodiments as disclosed herein. The second EES (100*b*) includes a memory (101*b*), a processor (102*b*) couples to the memory (101*b*), a communicator (103*b*) coupled to the processor (102*b*), an EES resilience controller (104*b*) connected to the memory (101*b*), the processor (102*b*), and the communicator (103*b*). The EES resilience controller (104*b*) is configured to receive the push request message from the first EES (100*a*) of the plurality of EESs (100*a-n*) to back-up content stored at the second EES (100*b*) for synchronization with the first EES (100*a*) and enable communication between the first EES (100*a*) and the EEC (not shown in figures) in the EEL of the edge network. The EES resilience controller (104*b*) is configured to validate the first EES (100*a*) based on the push request message received from the first EES (100*a*). Also, the EES resilience controller (104*b*) is configured to send the content stored at the second EES (100*b*) to back-up the first EES (100*a*) based on the push request message.

The memory (101*b*) is configured to store instructions to be executed by the processor (102*b*). The memory (101*b*) includes non-volatile storage elements. Examples of such non-volatile storage elements includes magnetic hard discs, optical discs, floppy discs, flash memories, or forms of EPROM or EEPROM memories. In addition, the memory (101*b*) is considered for example, a non-transitory storage medium. The term "non-transitory" indicates that the storage medium is not embodied in a carrier wave or a propagated signal. However, the term "non-transitory" is not be interpreted that the memory (101*b*) is non-movable. In some examples, the memory (101*b*) is configured to store larger amounts of information. In certain examples, a non-transitory storage medium stores data that can, over time, change (e.g., in RAM or cache).

The processor (102*b*) includes one or a plurality of processors. The one or the plurality of processors is a general-purpose processor, such as a CPU, an AP, or the like, a graphics processing unit such as a GPU, a VPU, and/or an AI-dedicated processor such as an NPU. The processor (102*b*) includes multiple cores and is configured to execute the instructions stored in the memory (101*b*).

In the embodiments, the communicator (103*b*) includes an electronic circuit specific to a standard that enables wired or wireless communication. The communicator (103*b*) is configured to communicate internally between internal hardware components of the second EES (100*b*) and with external devices via one or more networks.

In the embodiments, the push request message includes the content that requires to be back-up at the second EES (100*b*). The content includes the list of EEC contexts associated with the first EES, the list of EAS profiles associated with the first EES, the indication to back-up the content associated with the first EES, the details about the subscriptions over different EDGE interfaces, and the list of second EESs from the plurality of EESs configured at the first EES for back-up the content for the synchronization.

In the embodiments, the second EES (100*b*) further includes a database (107*b*) that is configured to store the content received from the first EES (100*a*) based on the received push request message, the details about the subscriptions over different EDGE interfaces, and identifier of the first EES (100*a*) of the plurality of EESs (100*a-n*).

In the embodiments, the EES resilience controller (104*b*) includes a push request receiver (105*b*), a validator (106*b*), an authorizer (108*b*), and a push response transmitter (109*b*). The push request receiver (105*b*) receives the push request message from the first EES (100*a*) and transmits the push request message to the validator (106*b*). The validator (106*b*) is configured to validates the first EES (100*a*) based on the push request message received from the first EES (100*a*). The validator (106*b*) is configured to checks the identity of the first EES (100*a*) by comparing with the identifier of the first EES (100*a*) of the plurality of EESs (100*a-n*) that is stored in the database (107*b*). After the comparison, the validator (106*b*) sends the result to the authorizer (108*b*). The authorizer (108*b*) is configured to check the result that is received from the validator (106*b*). On successful validation, the authorizer (108*b*) authorizes the first EES (100*a*) to back-up the content that is stored in the first EES (100*a*) and when the result of the validation gets failed, the authorizer (108*b*) rejects the push request message received from the first EES (100*a*). The failed validation represents the first EES is not the source of the second EES (100*b*) and also the first EES is not in the same EES set of the second EES.

In the embodiments, when the validation result is success, the authorizer (108*b*) sends the authorization message to the push response transmitter (109*b*). The push response transmitter (109*b*) transmits the authorization message to the first EES (100*a*), where the authorization message represents to authorize the first EES (100*a*) based on the success of the validation result received from the validator (106*b*).

In the embodiments, when the validation result is failed, the authorizer (108*b*) sends the rejection message to the push response transmitter (109*b*). The push response transmitter (109*b*) transmits the rejection message to the first EES (100*a*), where the rejection message is transferred to the first EES (100*a*) to reject the first EES based on the failed validation result received from the validator (106*b*).

The EES resilience controller (104*b*) is implemented by processing circuitry such as logic gates, integrated circuits, microprocessors, microcontrollers, memory circuits, passive electronic components, active electronic components, optical components, hardwired circuits, or the like, and optionally be driven by firmware. The circuits for example, be embodied in one or more semiconductor chips, or on substrate supports such as printed circuit boards and the like.

At least one of the plurality of modules/components of the EES resilience controller (104*b*) is implemented through an AI model. A function associated with the AI model is performed through the memory (101*b*) and the processor (102*b*). The one or a plurality of processors controls the processing of the input data in accordance with a predefined operating rule or the AI model stored in the non-volatile memory and the volatile memory. The predefined operating rule or artificial intelligence model is provided through training or learning.

Here, being provided through learning means that, by applying a learning process to a plurality of learning data, a predefined operating rule or AI model of a desired characteristic is made. The learning is performed in a device itself in which AI according to the embodiments is performed, and/or is implemented through a separate server/system.

The AI model consist of a plurality of neural network layers. Each layer has a plurality of weight values and performs a layer operation through calculation of a previous layer and an operation of a plurality of weights. Examples of neural networks include, but are not limited to, CNN, DNN, RNN, RBM, DBN, BRDNN, GAN, and deep Q-networks.

The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

FIG. 2 is a flow chart (200) illustrating a method for synchronizing the first EES (100*a*) and the second EES (100*b*) based on push mechanism, according to the embodiments as disclosed herein.

The terms "push request message", "context push request" and "push mechanism" are used interchangeably throughout the specification.

At step 210, in order to synchronize with entire backup EESs (100*b-n*), the primary/source EES (100*a*) sends EEC context push request to each backup EES (100*b*) of the plurality of backup EESs (100*b-n*). The context push request additionally contains required information to synchronize as shown in Table. 1. The context push request includes the content for example the list of EEC contexts, the list of EAS profiles, the indication of backup EES synchronization, the backup EES list identifier, and the details about the subscriptions over different EDGE interfaces. The list of EEC contexts represents the number of EECs that are getting service from the first EES (100*a*). The list of EEC contexts of the context push request is sending to the plurality of backup EES (100*b-n*) to synchronize with the plurality of backup EESs (100*b-n*). The list of EAS profiles represents the number of EASs are registered with the first EES (100*a*). The list of EAS profiles of the context push request is sending to the plurality of backup EES (100*b-n*) to synchronize with the plurality of backup EES (100*b-n*). The indication of backup EES synchronization represents the request for synchronizing the content with the plurality of backup EESs (100*b-n*). The backup EES list identifier represents the number of back EESs (100*b-n*) that are configured under the first EES (100*a*).

TABLE 1

| Information / content | Description |
|---|---|
| List of EEC contexts | List of EEC contexts to sync with backup EESs |
| List of EAS Profiles | List of EAS profiles to sync with backup EESs |
| Backup EES sync indication | Indicates that the request is for synchronizing content with backup EESs. |
| Backup EES list identifier | Identifies list of backup EESs |
| Subscription details | List of subscriptions over different EDGE (EDGE-1. EDGE-2, EDGE-3 and EDGE-7) interfaces |

At step 220, once the backup EES (100*b*) receives the context push request from the source/primary EES (100*a*), the backup EES (100*b*) validates and authorizes the primary/source EES (100*a*) based on the received context push request.

At step 230, when the primary/source EES (100*a*) is authorized and the part of same EES set, the backup EES (100*b*) stores content stored at the primary/source EES based on the push request, and information for synchronization, for example, the list of EEC contexts, and the list of EAS profiles.

In the embodiments, the first EES sends contents, as shown in Table. 1, to synchronize with backup EESs (100*b-n*) in a separate request message. The various actions, acts, blocks, steps, or the like in the method is performed in the order presented, in a different order or simultaneously. Further, in some embodiments, some of the actions, acts, blocks, steps, or the like are omitted, added, modified, skipped, or the like without departing from the scope of the proposed method.

FIG. 3 is a flow chart (300) illustrating a method for synchronizing the first EES (100*a*) and the second EES (100*b*) based on pull mechanism, according to the embodiments as disclosed herein.

The terms "pull mechanism", "context pull request" and "pull request message" are used interchangeably throughout the specification.

At step 310, in order to synchronize with the primary/source EES (100*a*), the back-up EES (100*b*) sends EES context pull request to the primary/source EES (100*a*). The context pull request additionally contains the indication for indicating the context pull request is for the content or context synchronization as shown in Table. 2. The context pull request includes the content for example, the indication of backup EES synchronization and the backup EES list identifier. The indication of backup EES synchronization represents the request for synchronizing the content with the plurality of backup EESs (100*b-n*). The backup EES list identifier represents the number of back EESs (100*b-n*) that are configured under the first EES (100*a*).

TABLE 2

| Information / content | Description |
|---|---|
| Backup EES sync indication | Indicates that the request is for synchronizing content with backup EESs. |
| Backup EES list identifier | Identifies list of backup EESs. |

At step 320, once the primary/source EES (100*a*) receives EES context pull request, the primary/source EES (100*a*) validates and authorizes the backup EES (100*b*).

At step 330, when the backup EES (100*b*) is authorized (checking whether the backup EES is the part of back up EES list in the EES set), the source EES (100*a*) sends context pull response containing the content stored at the primary/source EES (100*a*) to back-up at the backup EES (100*b*) based on the pull request. The context pull response includes the information for example, the list of EEC contexts, the list of EAS profiles as specified in Table. 3.

TABLE 3

| Information / content | Description |
|---|---|
| List of EEC contexts | List of EEC contexts to sync with backup EESs |
| List of EAS Profiles | List of EAS profiles to sync with backup EESs |
| Subscription details | List of subscriptions over different EDGE (EDGE-1. EDGE-2, EDGE-3 and EDGE-7) interfaces |

In the embodiments, the second EES (100*b*) sends request to the first EES (100*a*) to send contents for synchronize with the second EES (100*b*) in any other request message. The various actions, acts, blocks, steps, or the like in the method is performed in the order presented, in a different order or simultaneously. Further, in some embodiments, some of the actions, acts, blocks, steps, or the like are omitted, added, modified, skipped, or the like without departing from the scope of the proposed method.

FIG. 4*a* illustrating an interface connecting the first EES (100*a*) and an EES data repository (400), according to the embodiments as disclosed herein. In order to synchronize with the primary/source EES (100*a*), an EES data repository (400) is defined that store entire information (for example, the list of EEC contexts, the list of EAS profiles, etc.) that requires to synchronize with each backup EES (100*b*) of the plurality backup EESs (100*b-n*). Each backup EES (100*b*) of the plurality of back-up EESs (100*b-n*) in the backup EES list have access to the EES data repository (400).

In the embodiments, an interface between the first EES (100*a*) and the EES data repository (400) is defined that is called Interface-X or EDGE-X or EDGE-N and the like. The interface supports procedure for the first EES (100*a*) to store or update the data to synchronize with other backup EESs in the backup EES list. The interface also supports procedure for the authorized backup EES to access or fetch the data stored in the EES data repository (400).

In the embodiments, in order to store or update the data to EES data repository (400), the first EES (100*a*) sends the push request message containing its data (or content), for example, the list of EEC contexts, the list of EAS profiles and the details about the subscriptions over different EDGE interfaces, to the EES data repository (400) to store or update (modify/delete) the data. The request also includes the backup EES list identifier. The EES data repository (400) authorizes the first EES (100*a*) and when the first EES (100*a*) is authorized, the EES data repository (400) stores the data received from the first EES (100*a*).

In the embodiments, in order to get or fetch the data from the EES data repository (400), the second EES (100*b*) sends the pull request message to the EES data repository (400) containing the backup EES list identifier and the EES details (whose data is required to fetch). The EES data repository (400) authorizes the second EES (100*b*) and when the second EES (100*b*) is authorized, the EES data repository (400) provides the data in the pull response message.

FIG. 4*b* illustrates a block diagram of the EES data repository (400), according to the embodiments as disclosed herein. The EES data repository (400) includes a memory (401), a processor (402) is coupled the memory (401), a communicator (403) is coupled to the processor (402), and an EES repository controller (404) is coupled to the memory (401), the processor (402), and the communicator (403). The EES repository controller (404) is configured to receive the push request message from the first EES (100*a*) of the plurality of EESs (100*a-n*) to back-up the content stored at the first EES (100*a*) for synchronization with the second EES (100*b*). The EES repository controller (404) is further configured to authorize the first EES (100*a*) based on the push request message received from the first EES (100*a*). Also, the EES repository controller (404) is configured to store the content to back-up and synchronize with the second EES (100*b*) based on the received push request message. The EES data repository (400) further includes a database (408) that is configured to store the content received from the first EES (100*a*) based on the received push request message, the details about the subscriptions over different EDGE interfaces, and identifier of the first EES (100*a*) of the plurality of EESs (100*a-n*)

The memory (401) is configured to store instructions to be executed by the processor (402). The memory (401) includes non-volatile storage elements. Examples of such non-volatile storage elements include magnetic hard discs, optical discs, floppy discs, flash memories, or forms of EPROM or EEPROM memories. In addition, the memory (401) is considered for example, a non-transitory storage medium. The term "non-transitory" indicates that the storage medium is not embodied in a carrier wave or a propagated signal. However, the term "non-transitory" is not be interpreted that the memory (401) is non-movable. In some examples, the memory (401) is configured to store larger amounts of information. In certain examples, a non-transitory storage medium stores data that can, over time, change (e.g., in RAM or cache).

The processor (402) includes one or a plurality of processors. The one or the plurality of processors is a general-purpose processor, such as a CPU, an AP, or the like, a graphics processing unit such as a GPU, a VPU, and/or an AI-dedicated processor such as an NPU. The processor (402) includes multiple cores and is configured to execute the instructions stored in the memory (401).

In the embodiments, the communicator (403) includes an electronic circuit specific to a standard that enables wired or wireless communication. The communicator (403) is configured to communicate internally between internal hardware components of the EES data repository (400) and with external devices via one or more networks.

In the embodiments, the EES data repository (400) is configured to receive the pull request message from the second EES (100*b*) of the plurality of EESs (100*b-n*) to fetch the content stored by the first EES (100*a*) for synchronization with the second EES (100*b*) and enabling communication between the second EES (100*b*) and the EEC (not shown in figures) in the EEL of the edge network. The EES data repository (400) includes the content of the first EES (100*a*) for synchronization with the second EES (100*b*) associated with the first EES (100*a*) in the EEL of the edge network. Also, the EES data repository (400) is configured to send the content to back-up at the second EES (100*b*).

In the embodiments, the EES data repository (400) includes a push request receiver (405), a push request validator (406), a push request authorizer (407), and a pull response transmitter (412). The push request receiver (405) of the EES data repository (400) is configured to receive the pull request message from the second EES (100*b*) of the plurality of EESs (100*b-n*) to fetch the content stored by the first EES (100*a*) for synchronization with the second EES (100*b*). The push request validator (406) of the EES data repository (400) is configured to check the identity of the first EES (100*a*) by comparing with the identifier of the first EES (100*a*) of the plurality of EESs (100*a-n*) that is stored in the database (408). The push request authorizer (407) of the EES data repository (400) is configured to authorize the first EES (100*a*) based on the push request message received from the first EES (100*a*). Once the first EES (100*a*) is authorized, the content from the first EES (100*a*) is stored in the database (408).

In the embodiments, the EES data repository (400) includes a pull request receiver (409), a pull request validator (410), and a pull request authorizer (411). The pull request receiver (409) of the EES data repository (400) is configured to receive the pull request message from the second EES (100*b*) of the plurality of EESs (100*b-n*) to fetch the content stored by the first EES (100*a*) for synchronization with the second EES (100*b*). The pull request validator (410) of the EES data repository (400) is configured to check the identity of the second EES (100*b*) by comparing with the identifier of the second EES (100*b*) of the plurality of EESs (100*a-n*) that is stored in the database (408). The pull request authorizer (411) of the EES data repository (400) is configured to authorize the second EES (100*b*) based on the pull request message received from the second EES (100*b*). Once the second EES (100*a*) is authorized, the content in the database (408) are transmitting to the second EES (100*b*) via the pull response transmitter (412).

The EES repository controller (404) is implemented by processing circuitry such as logic gates, integrated circuits, microprocessors, microcontrollers, memory circuits, passive electronic components, active electronic components, optical components, hardwired circuits, or the like, and optionally be driven by firmware. The circuits for example, be embodied in one or more semiconductor chips, or on substrate supports such as printed circuit boards and the like.

At least one of the plurality of modules/components of the EES repository controller (404) is implemented through an AI model. A function associated with the AI model is performed through memory (401) and the processor (402). The one or a plurality of processors controls the processing of the input data in accordance with a predefined operating rule or the AI model stored in the non-volatile memory and the volatile memory. The predefined operating rule or artificial intelligence model is provided through training or learning.

Here, being provided through learning means that, by applying a learning process to a plurality of learning data, a predefined operating rule or AI model of a desired characteristic is made. The learning is performed in a device itself in which AI according to the embodiments is performed, and/or is implemented through a separate server/system.

The AI model consist of a plurality of neural network layers. Each layer has a plurality of weight values and performs a layer operation through calculation of a previous layer and an operation of a plurality of weights. Examples of neural networks include, but are not limited to, CNN, DNN, RNN, RBM, DBN, BRDNN, GAN, and deep Q-networks.

The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

FIG. 5 is a flow chart (500) illustrating a method for sending the list of second EESs to the EEC, according to the embodiments are disclosed herein.

At step 510, the method includes, the first EES (100*a*) is configured with the list of backup EESs by a service provider.

At step 520, the method includes, the first EES (100*a*) performs EES registration, where the EES registration message additionally includes the list of backup EESs and backup EES list identifier as shown in Table. 4. The first EES (100*a*) indicates the list of backup EESs to an ECS (600) in the EES registration.

TABLE 4

| Information / content | Description |
|---|---|
| List of backup EESs | Provides list of backup EESs |
| Backup EES list identifier | Identifies list of backup EESs. |

At step 530, the method includes, the ECS (600) stores the list of the backup EESs for each first EES (100*a*) of the plurality of EES (100*a-n*).

At step 540, the method includes, once the ECS (600) is receiving a service provisioning request from the EEC, the ECS sends service provisioning response towards the EEC, where the service provisioning response includes a list of EESs in the ECS, a EES set identifier and the list of back up EESs as shown in Table. 5. The list of backup EESs in the service provisioning response is same as the list of backup EESs provided at time of the EES registration or subset of it.

TABLE 5

| Information / content | Description |
|---|---|
| List of backup EESs | Provides list of backup EESs |
| Backup EES list identifier | Identifies list of backup EESs. |

At step 550, the method includes, the EEC stores the list of backup EESs for each first EES (100*a*) of the plurality of first EES (100*a-n*). When the first EES (to which EEC is registered) is not available, the EEC uses one of the backup EESs to further communicate and to receive service.

The various actions, acts, blocks, steps, or the like in the method is performed in the order presented, in a different order or simultaneously. Further, in some embodiments, some of the actions, acts, blocks, steps, or the like are omitted, added, modified, skipped, or the like without departing from the scope of the proposed method.

The terms “service provisioning request” and “service provisioning request message” are used interchangeably throughout the specification and the terms “service provisioning response” and “service provisioning response message” are used interchangeably throughout the specification.

In the embodiments, the service provisioning request message includes the list of backup EESs and the backup EES list identifier and the service provisioning response message includes the list of backup EESs or prioritized list of backup EESs.

FIG. 6 is a flow chart (600) illustrating a method for synchronizing the first EES (100*a*) and the second EES (100*b*) by the EES data repository (400), according to the embodiments are disclosed herein.

At step 610, the method includes, receiving the push request message from the first EES (100*a*) of a plurality of EESs (100*a-n*) to back-up the content stored at the first EES (100*a*) for synchronization with the second EES (100*b*).

At step 620, the method includes, authorizing, the first EES (100*a*) based on the push request message received from the first EES (100*a*).

At step 630, the method includes, storing the content to back-up and synchronize with the second EES (100*b*) based on the received push request message.

At step 640, the method includes, receiving the pull request message from the second EES (100*b*) of the plurality of EESs (100*a-n*) to fetch the content stored by the first EES (100*a*) for synchronization with the second EES (100*b*).

At step 650, the method includes, sending the content to back-up at the second EES (100*b*).

The various actions, acts, blocks, steps, or the like in the method is performed in the order presented, in a different order or simultaneously. Further, in some embodiments, some of the actions, acts, blocks, steps, or the like are omitted, added, modified, skipped, or the like without departing from the scope of the proposed method.

In the embodiments, an indication in pull request message is to indicate primary EES (100*a*) that the request is for content synchronization.

In the embodiments, the list of EEC contexts in pull response message and in push request message is to provide registered EECs for synchronization.

In the embodiments, the list of EAS profiles in pull response message and in push request message is to provide registered EAS for synchronization.

In the embodiments, the list of backup EESs in EES registration request message to indicate ECS about the backup EESs to be used in service provisioning response.

In the embodiments, the list of backup EESs in service provisioning response to inform EEC about backup EESs to be used at the time when there is no response received from the primary EES (100*a*) for any service requests.

In the embodiments, the EES data repository (400) to store entire information that is required for synchronization among the list of backup EESs.

In the embodiments, an interface between the first EES (100*a*) and the EES data repository (400) is configured to support for storing, updating and fetching the data for the synchronization.

In the embodiments, the first EES (100*a*) provides the list of backup EESs to the EEC in EEC registration response.

In the embodiments, the first EES (100*a*) provides the list of backup EESs to the EAS in EAS registration response.

In the embodiments, the first EES (100*a*) provides the list of backup EESs to the EEC in EAS discovery response.

In the embodiments, the list of backup EESs is provided to the EEC that contains the backup EESs in prioritized order where EEC initiates the communication to the backup EES in the provided order when the primary EES (100*a*) is not responsive.

In the embodiments, the list of backup EESs provided to the EAS that contains the backup EESs in prioritized order where EAS initiates the communication to the backup EES in the provided order when primary EES (100*a*) is not responsive.

In the embodiments, the EEC or EAS is implicitly registered to the backup EES (100*b*) when the primary EES (100*a*) is not responsive (due to failure) and the EEC or the EAS first tries to reach to the backup EES from the backup EES list.

In the embodiments, the EAS registers to entire backup EESs in the list of backup EESs.

In the embodiments, the synchronization of data between the backup EESs from the list of backup EESs and the primary EES (100*a*) occurs regularly (i.e., periodically or at time of plan shut down of the primary EES).

In the embodiments, the list of backup EESs contains EESs from different EDNs.

The foregoing description of the specific embodiments will so fully reveal the general nature of the embodiments herein that others can, by applying current knowledge, readily modify and or adapt for various applications such specific embodiments without departing from the generic concept, and, therefore, such adaptations and modifications are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method of a first edge enabler server (EES) in an edge network comprising the first EES and a second EES, wherein the method comprises:

receiving, from the second EES, a context push request message for context transfer procedures;

validating and authorizing the second EES in response to the push request message; and in case that the second EES is authorized and the first EES and the second EES are part of same EES set of the edge network, storing first information included in the context push request message for synchronization with the second EES and transmitting, to the second EES, a context push response message, wherein the first information comprises at least one of a list of edge enabler client (EEC) contexts, or a list of edge application server (EAS) profiles.

2. The method of claim 1, wherein the first information further comprises an indication for context synchronization between the first EES and the second EES.

3. The method of claim 1, wherein second information included in the context push response message comprises at least one of the list of EEC context, the list of EAS profiles, or an indication for context synchronization between the first EES and the second EES.

4. A method of a second edge enabler server (EES) in an edge network comprising at least one first EES and the second EES, the method comprising:

transmitting, to the at least one first EES, a context push request message for context transfer procedures; and in case that the second EES is authorized, and the at least one first EES and the second EES are part of same EES set of the edge network, receiving, from the at least one first EES, a context push response message, wherein first information included in the context push request message is stored in the at least one first EES, and wherein the first information comprises at least one of a list of edge enabler client (EEC) contexts, or a list of edge application server (EAS) profiles.

5. The method of claim 4, wherein the first information included in the context push request message further comprises an indication for content synchronization between the at least one first EES and the second EES.

6. The method of claim 4, further comprising:

transmitting, to edge configuration server (ECS), an EES registration request message including indication for the at least one second EES.

7. The method of claim 4, wherein second information included in the context push response message comprises at least one of the list of EEC contexts, the list of EAS profiles, or an indication for context synchronization between the first EES and the second EES.

8. A first edge enabler server (EES) in an edge network comprising the first EES and a second EES, wherein the first EES comprises:

a memory;

a communicator; and a processor coupled to the memory and the communicator, and configured to:

receive, from the second EES, a context push request message for context transfer procedures, validate and authorize the second EES in response to the push request message, and in case that the second EES is authorized and the first EES and the second EES are part of same EES set of the edge network, store first information included in the context push request message for synchronization with the second EES and transmit, to the second EES, a context push response message, wherein the first information comprises at least one of a list of Edge Enabler Client (EEC) contexts, or a list of edge application server (EAS) profiles.

9. The first EES of claim 8, wherein the first information further comprises an indication for context synchronization between the first EES and the second EES.

10. The first EES of claim 8, wherein second information included in the context push response message comprises at least one of the list of EEC context, the list of EAS profiles, or an indication for context synchronization between the first EES and the second EES.

11. A second edge enabler server (EES) in an edge network comprising at least one first EES and the second EES, the second EES comprising:

a memory;

a communicator; and a processor coupled to the memory and the communicator, and configured to:

transmit, to the at least one first EES, a context push request message for context transfer procedures, and in case that the second EES is authorized, and the at least one first EES and the second EES are part of same EES set of the edge network, receive, from the at least one first EES, a context push response message, wherein first information included in the context push request message is stored in the at least one first EES, and wherein the first information comprises at least one of a list of edge enabler client (EEC) contexts, or a list of edge application server (EAS) profiles.

12. The second EES of claim 11, wherein the first information included in the context push request message further comprises an indication for content synchronization between the at least one first EES and the second EES.

13. The second EES of claim 11, wherein the processor is further configured to:

transmit, to edge configuration server (ECS), an EES registration request message including indication for the at least one second EES.

14. The second EES of claim 11, wherein second information included in the context push response message comprises at least one of the list of EEC contexts, the list of EAS profiles, or an indication for context synchronization between the first EES and the second EES.

* * * * *